United States Patent Office 3,077,414
Patented Feb. 12, 1963

3,077,414
PRODUCTION OF SULPHATE OPAL GLASSES
Richard M. Wiker, Painted Post, N.Y., assignor to Corning Glass Works, Corning, N.Y., a corporation of New York
No Drawing. Filed Nov. 2, 1959, Ser. No. 850,106
8 Claims. (Cl. 106—52)

This invention relates to the melting of sulphate opal glasses and is particularly concerned with a melting method that provides improved opal density control in such glasses.

The term "sulphate opal glass" is used in a conventional sense to indicate a glass having numerous, minute, light-diffusing particles dispersed therein, such particles having an index of refraction differing from that of the glass to produce an opaque or translucent appearance. The opacifying particles are composed of a sulphate compound, usually sodium sulphate. For present purposes, a sulphate opal glass may, in addition to the opacifying sulphate particles, optionally contain another opacifying agent such as a fluoride.

During the melting of a sulphate opal glass, sodium sulphate appears in the form of liquid droplets dispersed throughout the molten bath. As the glass cools, these liquid droplets are "frozen" in the glass body, that is they solidify as dispersed particles, and may shatter into smaller crystallites. While sodium sulphate may be introduced into the glass batch as such, under some circumstances, it is conventional practice to employ a sulphate batch material that reacts during melting to form sodium sulphate, for example barium or aluminum sulphate.

Opal density is determined primarily by the number of particles in a unit volume of glass, but also by the particle size. It may vary from the complete opaqueness of a dense alabaster glass, that is one which provides essentially zero light transmission, to a faint translucence that is visually discernible only in relatively thick glass sections. Opal density control is generally desirable for appearance purposes, but becomes of critical importance in production of illuminating glassware, such as incandescent lamp globes and fluorescent lamp panels, where light transmission characteristics and control determine product utility.

Sulphate opal glasses have long been known in the glass art, but have been largely bypassed in favor of other types of opal glasses, particularly the fluoride and phosphate opals. Inasmuch as sulphate opal glasses frequently provide a more desirable appearance, particularly for illuminating glassware, their failure to achieve commercial significance has apparently been occasioned by the difficulty encountered in reproducibly melting such glasses and controlling their opal density. Whereas opal development and control in other types of opal glasses is achieved largely by controlled thermal treatment subsequent to the glass melting process, I have discovered that proper sulphate opal development and control is largely dependent on the actual glass melting process and its control.

A primary purpose of the present invention is to provide improved opal sulphate glasses and improvements in the production of such glasses. Another purpose is to provide a method of melting such glasses whereby opal density may be widely varied, yet closely controlled. A further purpose is to provide for the production of illuminating glassware from sulphate opal glasses.

My invention resides in a method of producing a sulphate opal glass which comprises the improvements of introducing into the batch from which such glass is melted a material capable of providing at least about 0.7% arsenic oxide in the glass, and heating the fusion product of such batch to a maximum temperature not exceeding 1500° C. during melting.

Any convenient source of arsenic oxide may be employed as a batch material in carrying out the invention. While the oxide itself, either in trivalent or pentavalent form, is most commonly used, a compound such as sodium arsenate may also be suitable. Heretofore, arsenic and antimony oxides have been widely used, either in combination or individually, as fining agents in the melting of most types of glass. Fining means facilitating and accelerating the removal of gas entrapped in the form of seeds or bubbles during the glass melting process. It has been generally recognized in the glass art that, while these oxides might differ slightly in degree of effectiveness for fining purposes depending on the particular glass composition and batch ingredients, they functioned in essentially an identical manner and hence were equivalent for the purpose. It was particularly surprising and unexpected to find that arsenic oxide had a specific effect in the production of a sulphate opal and that antimony oxide did not have a similar effect and hence was not an equivalent of arsenic oxide for present purposes. It will be understood that antimony compounds have no adverse effect and may also be present in glasses produced in accordance with the present invention. In general, the arsenic oxide need not exceed about 2% for present purposes.

It had previously been recognized that the presence of antimony oxide in a glass could serve as a deterrent to solarization, that is development of colorization in a clear glass during extended exposure to irradiation such as sunlight. Accordingly, in producing illuminating glassware, it has heretofore been common practice to incorporate antimony oxide in the glass to serve both as a fining agent and an inhibitor of solarization. In melting sulphate opal glasses for illuminating purposes in accordance with the present invention, it may be either undesirable or uneconomical to incorporate antimony oxide when it is not required for fining purposes. Where this situation exists, I have found that on the order of 0.5% or more titanium oxide may conveniently be incorporated in the glass to inhibit solarization and thereby replace the antimony oxide previously employed.

I have further found that, in addition to providing at least a minimum amount of arsenic oxide in the glass, the maximum melting temperature is a critical factor in sulphate opal development and that close control of this maximum temperature is a critical factor in producing glass with a consistent degree of opal density. Thus a variation of as little as five degrees in the maximum melting temperature may so change opal density in a sulphate opal glass as to render the glass unsuitable for particular illuminating purposes. A maximum melting temperature of 1450° C. produces a dense opal but may be too low for proper glass melting and handling. As the temperature is increased to 1500° C. opal density decreases rapidly and above 1500° C. an essentially clear or non-opal glass results.

It will be understood that all references to glass melting temperatures refer to the glass furnace temperature as optically read from the bridge wall of a commercial glass melting tank. Where other types of glass melting temperature measurements are to be employed, temperatures here specified in terms of the generally accepted standard bridge wall method of measurement will be translated to equivalent temperatures as measured by such other means.

In general, the present invention is not limited to any particular glass batch ingredients, base glass compositions, or melting procedures, except as indicated. Accordingly, one practicing the present invention may expect to employ ordinary or conventional materials and methods as modified by the specific teachings of this application. Conventional glass formulating and melting practices are set forth in such textual material as "Glass Engineering Handbook," by E. B. Shand, second edition, McGraw-Hill Book Co., 1958, more particularly section 2 of that text by Dr. C. H. Greene.

While the present invention relates to sulphate opal glasses in general and is not restricted to any particular base glass, it is described illustratively with reference to a silicate illuminating glass composed essentially of 55–75% $SiO_2$, 5–20% of one or more of the alkali metal oxides $Na_2O$, $K_2O$ and $Li_2O$, up to 15% of one or more of the divalent oxides MgO, CaO, BaO, ZnO, PbO and SrO, 0-15% $Al_2O_3$ and optionally minor amounts, totalling not over about 5%, of other compatible glass making materials such as boric oxide and a fluoride. In addition to these commonly used glass forming, flux and stabilizing materials, the illuminating glass will contain at least 0.7% arsenic oxide, up to about 3% sulphur oxide, or sulphate ion, calculated as $SO_3$, the maximum amount being that compatible without forming a sodium sulphate layer on the glass bath surface, and optionally from 0.5 to about 2% $TiO_2$ and/or $Sb_2O_3$ for inhibition of solarization. Conventional glass colorants may also be present in known manner if desired.

More specifically, the invention is described with reference to production of a pale opal or translucent glass adapted to production of prismatic light transmitting panels as described in a copending application Ser. No. 810,840, filed in the names of W. O. Benjamin and A. R. Jaeger on May 13, 1959, and assigned to the assignee of this application. The approximate composition of this glass, on an oxide basis, and a calculated formula for a batch from which the glass might be melted, are:

| Glass | | Batch | |
|---|---|---|---|
| $SiO_2$ | 60 | Sand | 900 |
| $Na_2O$ | 15 | $Na_2CO_3$ | 300 |
| $Al_2O_3$ | 10 | $NaNO_3$ | 119 |
| BaO | .9 | $Na_2SiF_6$ | 12 |
| $TiO_2$ | 0.7 | $BaCO_3$ | 81 |
| $B_2O_3$ | 0.5 | $BaSO_4$ | 110 |
| $As_2O_3$ | 1.2 | $Al(OH)_3$ | 229 |
| F | 0.5 | Anhyd. Borax | 12 |
| $Sb_2O_3$ | 0.5 | $As_2O_3$ | 18 |
| $SO_3$ | 2.5 | $Sb_2O_3$ | 8 |
| | | $TiO_2$ | 11 |

The glass batch was introduced into a medium size, commercial, continuous glass melting tank adapted to supply on the order of 20 tons of glass per day to a flat glass rolling machine. The glass was initially melted at glass temperatures varying increasingly from about 1050° C. to about 1400° C., the fusion product brought to a maximum optical temperature of 1480±5° C. in the vicinity of the tank bridgewall, and thereafter brought into a delivery chamber for introduction to the rolling machine, the glass being cooled sufficiently for proper handling by the machine. Sheets of glass produced in this manner were found to consistently contain a proper amount of sulphate opacifying particles to fall within the dense and light opal limits set forth in the previously mentioned application.

It will be understood that, while there must be sufficient sulphate present in the glass batch to provide the precipitated sulphate particles in the glass, the mere altering of sulphate content in the batch is at most a secondary means of opal density control. The primary means of control is maximum glass melting temperature together with the presence of an adequate amount of arsenic oxide in the glass batch. It will further be appreciated that, while close temperature control is critical in obtaining uniform or reproducible opal density in a glass, the particular temperature required to produce a desired opal density may vary slightly with changes in the glass melting unit and in glass melting practices such as cullet ratio and rate of glass melting. In particular, opal density appears to be sensitive to cullet ratio, that is ratio of cullet to raw batch, an increase in the cullet producing a paler opal and, conversely, a cullet ratio decrease producing a denser opal. The basis for such change is not understood and it is desirable to maintain a constant cullet ratio in the batch. Accordingly, a certain amount of routine experimentation may be expected in adjusting practice of the present invention to specific melting conditions.

What is claimed is:

1. In the production of a sulphate opal glass by melting a glass batch adapted to produce an alkali silicate glass composed essentially of 55–75% $SiO_2$, 5–20% of at least one alkali metal oxide, at least one divalent metal oxide in an amount not exceeding 15%, 0–15% $Al_2O_3$ and containing a sufficient amount of sulphate ion to provide a separate sulphate opal phase in the glass melt, an improved method of controlling opal density which comprises the steps of introducing into the glass batch, in vitrifiable amount, a source of arsenic oxide capable of providing 0.7–2.0% arsenic oxide in the glass melt, and melting the batch at temperatures not exceeding 1500° C.

2. A method of producing a sulphate opal glass which, on an oxide basis, is composed essentially of 55–75% $SiO_2$, 5–20% of at least one alkali metal oxide, at least one divalent metal oxide in an amount not exceeding 15%, 0–15% $Al_2O_3$ and a sufficient amount of sulphate ion to provide a separate sulphate opal phase in the glass, the method comprising forming a glass batch adapted to produce such glass on melting, introducing a source of arsenic oxide into such glass batch in a vitrifiable amount that is capable of providing 0.7–2.0% arsenic oxide in a melt of such batch, and melting such batch at optical temperatures not exceeding 1500° C.

3. In the production of a sulphate opal glass which, on an oxide basis, is composed essentially of 55–75% $SiO_2$, 5–20% of at least one alkali metal oxide, at least one divalent metal oxide in an amount not exceeding 15%, 0–15% $Al_2O_3$, and an amount of sulphate ion sufficient to provide a sulphate opal phase in the glass, and wherein glass batch formulated to produce such glass is continuously melted, the method of consistently producing a controlled opal density in the glass which comprises introducing into the glass batch a source of arsenic oxide in vitrifiable amount capable of providing 0.7–2.0% arsenic oxide in the glass melt, melting the glass batch at a temperature below 1500° C. and maintaining the maximum melting temperature within a range of 5° C.

4. A method in accordance with claim 1 wherein the amount of arsenic-containing material introduced is sufficient to provide 1–2% arsenic oxide in the glass.

5. A method in accordance with claim 1 which includes additionally introducing into the glass batch a vitrifiable amount of a titanium compound capable of providing at least about 0.5% $TiO_2$ in the glass.

6. A method in accordance with claim 1 in which the maximum melting temperature is approximately 1480° C.

7. The method of claim 2 wherein the maximum melting temperature is about 1480° C.

8. A method in accordance with claim 3 wherein the glass is melted in a continuous melting unit from a glass batch containing both cullet and raw batch materials and the ratio of cullet to raw batch materials in the glass batch is maintained substantially constant.

References Cited in the file of this patent

UNITED STATES PATENTS

| | | |
|---|---|---|
| 2,552,125 | Tillyer | May 8, 1951 |
| 2,571,242 | Hood | Oct. 16, 1951 |
| 2,636,420 | Ryan et al. | Apr. 28, 1953 |
| 2,669,808 | Duncan et al. | Feb. 23, 1954 |
| 2,779,136 | Hood et al. | Jan. 29, 1957 |
| 2,898,219 | Duncan | Aug. 4, 1959 |
| 3,003,886 | Pither | Oct. 10, 1961 |